United States Patent
Gallagher et al.

(10) Patent No.: US 6,772,974 B2
(45) Date of Patent: Aug. 10, 2004

(54) SYSTEMS AND METHODS FOR PRECISION MAPPING AND REMOVAL OF DEFECTS IN A SPOOLED MATERIAL USING SPOOL ROTATION AND VARIABLE WINDING PITCH

(75) Inventors: Christopher Timothy Gallagher, Atlanta, GA (US); Jason W. Shiroishi, Decatur, GA (US); William H. Sleigher, Jr., Alpharetta, GA (US); Zhi Zhou, Lawrenceville, GA (US)

(73) Assignee: Fitel USA Corp., Norcross, GA (US)

( * ) Notice: Subject to any disclaimer, the term of this patent is extended or adjusted under 35 U.S.C. 154(b) by 49 days.

(21) Appl. No.: 10/299,389

(22) Filed: Nov. 19, 2002

(65) Prior Publication Data

US 2004/0094654 A1 May 20, 2004

(51) Int. Cl.[7] .............................................. B65H 54/22
(52) U.S. Cl. ................. 242/478.2; 242/485; 242/485.6; 242/470; 242/178; 242/563.2
(58) Field of Search ............................. 242/470, 478.2, 242/485, 485.1, 485.4, 485.5, 485.6, 128, 178, 563.2, 476.7

(56) References Cited

U.S. PATENT DOCUMENTS

| | | | | |
|---|---|---|---|---|
| 5,449,393 A | * | 9/1995 | Tsuneishi et al. | 65/377 |
| 6,222,899 B1 | * | 4/2001 | Pryor et al. | 377/24 |
| 6,296,201 B1 | | 10/2001 | Jackson et al. | |
| 6,371,394 B1 | * | 4/2002 | Roba | 242/178 |
| 6,409,117 B2 | * | 6/2002 | Petersen et al. | 242/485.6 |

* cited by examiner

Primary Examiner—Kathy Matecki
Assistant Examiner—Evan H Langdon
(74) Attorney, Agent, or Firm—Alston & Bird LLP

(57) ABSTRACT

A precision method is defined for identifying defective sections of a spoolable material for removal. Defective sections are noted during manufacture and the spool containing the material is subsequently unwound to allow removal of the defective sections. The invention uses rotation data corresponding to the location on the spool where the fiber contains defects. A process controller records rotational positioning data from the take-up spool during manufacturing and uses the information to locate the defect when unwinding the spool. In addition, the pitch of winding the fiber onto the spool may be altered during manufacturing to indicate the beginning and end of a defective section. In this instance, the defective portion of the fiber can be determined during unwinding by monitoring the pitch width of the material. Finally, an algorithm for defining cut out bands adjacent to the defective sections aid in ensuring that no remaining defective fiber remains.

23 Claims, 8 Drawing Sheets

SYSTEMS AND METHODS FOR PRECISION MAPPING AND REMOVAL OF DEFECTS IN A SPOOLED MATERIAL USING SPOOL ROTATION AND VARIABLE WINDING PITCH

FIELD OF INVENTION

The invention relates in general to the manufacture of spoolable material, and more specifically, to determining the location of defects previously identified in a material during manufacture and the removal of the defect in post-manufacturing processing.

BACKGROUND OF THE INVENTION

The manufacturing of optical fiber is well known and is described in part in U.S. Pat. No. 5,298,047 to Hart Jr., et al., which discloses the major steps in the manufacturing of optical fibers and is incorporated herein by reference.

The manufacturing of optical fiber involves drawing or pulling a strand of fiber from a molten cylinder of pure glass. A solid cylinder of pure glass typically referred to as a preform assembly is heated using a furnace by conventional means. A portion of the glass becomes molten and a thin strand of glass is drawn from the preform assembly to begin the process of forming an optical fiber. The optical fiber is monitored in real time by various quality control instruments, such as a diameter monitor measuring the optical fiber diameter as it is drawn. As the fiber is drawn from the molten cylinder, the fiber cools down and eventually encounters a capstan wheel and a series of take-up wheels. The fiber is then rolled onto a take-up spool accumulating the manufactured fiber.

The length of fiber that is wound on the take-up spool is measured in the prior art using an odometer. The optical fiber passes over the roller of the odometer allowing the odometer to measure the length of fiber passing over the roller. The usage of an odometer to measure length is well known in the art of manufacturing optical fiber, as well as manufacturing cables, copper wires, et cetera.

During the manufacturing process, defects occasionally occur in the optical fiber. The nature of the defect is not critical to the principles of this invention, but may include imperfect cross-sectional geometries, unacceptable variations in the diameter, and the presence of tiny air bubbles, known as airlines. The causes of such defects are varied, and include impurities in the glass, uneven heat conduction, too small or too great of a draw rate, et cetera.

During manufacturing, the system may be drawing optical fiber at a high rate (e.g., 10–30 meters/second). The take-up spool typically has a diameter of 600 mm and rotates at a high speed to take up the fiber at the required rate. Consequently, a few seconds at this draw rate corresponds to a length of many meters of the optical fiber and many rotations of the take-up spool. It is not uncommon for a defect to exist for a number of seconds, so that the defective section may be hundreds of meters long. The odometer provides real-time information concerning the length of the fiber to a control processor that also receives inputs regarding the fiber quality. Using the odometer readings, the process controller records in a memory the location of defects observed in the optical fiber.

To remove defects in the fiber after the manufacturing process, the spool can be removed from the system and placed on a rewinder. The rewinder unwinds the fiber on the take-up spool by winding it onto another spool. The fiber is unwound from the take-up spool until the defect is located using an odometer position, and the optical fiber is physically cut. The defective optical fiber is further unwound from the take-up spool and discarded. Once all the defective fiber is removed, the acceptable fiber is rewound on another spool and the process repeated.

The prior method of determining the location of the section containing the defect (henceforth, simply referred to as 'defect') during rewinding is based on the process controller noting the odometer reading at the beginning and end of the defect during the fiber draw. The recordation of the odometer reading is automated, so that when the quality control monitoring system detects a defect, the odometer is read. Once the defect is no longer detected, the odometer is again noted. Thus, information is maintained indicating the length at which the defect begins and ends. Additional quality related information may be continuously recorded as well.

Removal of defects also relies on an odometer during the rewinding process to locate the defect. The odometer readings obtained during manufacture are key to measuring the required distances to locate the beginning and ends of the defective section. Further, accurately replicating the distances during rewinding is key to accurately locating the defect during the defect removal process. The odometer measures the distances, typically based in meters, of the location to the defect and the location to the end of the defect. Because absolute distances are measured, these values are independent of the particular spool being used to unwind/rewind the fiber. Thus, the odometer measures the distances of the defect on the fiber, independent of the spool.

Two competing concerns are involved in the removal of the defects. First, the process should remove the entire length of the defect. Specifically, even a short portion of defective optical fiber not removed from the fiber can degrade the optical transmission characteristics of the remaining optical fiber. To ensure that all the defective optical fiber is removed, additional fiber is removed both before and after the location of the defect. These additional sections are called 'cut out bands' and are of a fixed length. Second, it is desirable to minimize waste, and this is accomplished by minimizing the removal of acceptable fiber.

To ensure both concerns are effectively addressed, the location of the defects must be accurately noted and locatable during rewinding. However, inaccuracies exist in the odometer that measures the fiber. The readings of the odometer may be inaccurate if the fiber slips when moving over the roller. This depends, in part, on the tension on the fiber from the take-up spool pulling the optical fiber, condition of the capstan, condition of the capstan belt, condition of encoder, or condition of any other mechanical device used in recording length. The fiber exhibits some elasticity when being pulled and the tension on the fiber when unwinding for removing the defect should be within specified limits. For example, excess tension can cause minute stretching of the fiber, or worse, breakage. Although these inaccuracies are insignificant when working with short lengths (e.g., hundreds of meters), they are significant when working with long lengths (e.g., hundreds of kilometers). For example, if the cumulative inaccuracy between two odometers during spooling and rewinding is 0.1%, then the inaccuracy results in a length of 500 meters over a 500 kilometer length.

Thus, there is a need for more accurately measuring the location of a defect on a spool of optical fiber so that the defective section can be removed with reduced waste. The determination of the location of a defect should also account for the inherent inaccuracies that become more significant when measuring greater lengths of the optical fiber. Similar issues are also typically present in the manufacture of other spoolable materials and are also in need of more accurate determination of the location of defects in the material.

BRIEF SUMMARY OF THE INVENTION

It is one objective of the present invention to define a method for indicating the location of a defect in a material as it is wound on a spool comprising the steps of winding the material onto a spool, monitoring the material for defects, and indicating the location of the fiber on the spool corresponding to where a defect in the material is located on the spool. This is accomplished by recording rotational data associated with the spool upon which the material is wound, and/or detecting a change in pitch of the material wound upon the spool.

It is another objective of the present invention to define a method for removing a defect in a material wound on a spool comprising the steps of unwinding the material from the spool, detecting an indication of a defect in the material wound about the spool, and removing portions of the material wound about the spool.

It is another objective of the present invention to define a method for removing a defect in a material wound by incorporating a cut-out band that comprises a fixed part and a rotational part, where the rotational part is based on the relative location of the defect from the end of the material.

It is another objective of the present invention to define an apparatus for winding the material onto a spool comprising a monitoring device in communication with the material for monitoring defects in the material as it is wound onto the spool, and an indicator in communication with the monitoring device, wherein the indicator indicates the location on the spool where a defect is present in the material by using rotational counts, detecting a change in pitch, or a combination thereof.

It is another objective of the present invention to define an apparatus for removing defective material from a spool comprising an unwinding device for unwinding the material from a spool and an indicator for indicating the location of the defective material, wherein the indicator indicates the location on the spool where a defect is present in the material by using rotational counts, detecting a change in pitch, or a combination thereof.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5A:
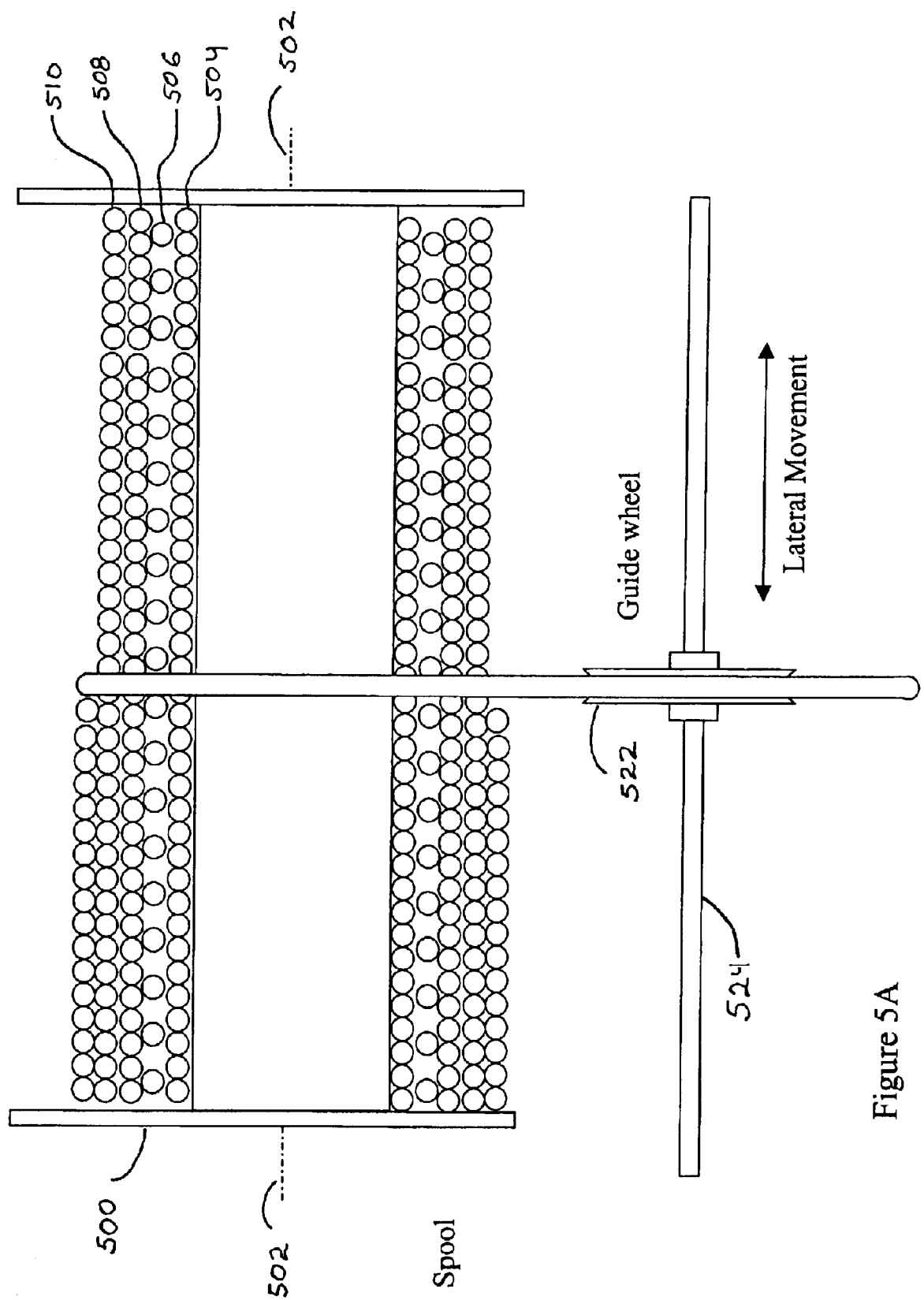
Figure 5B:
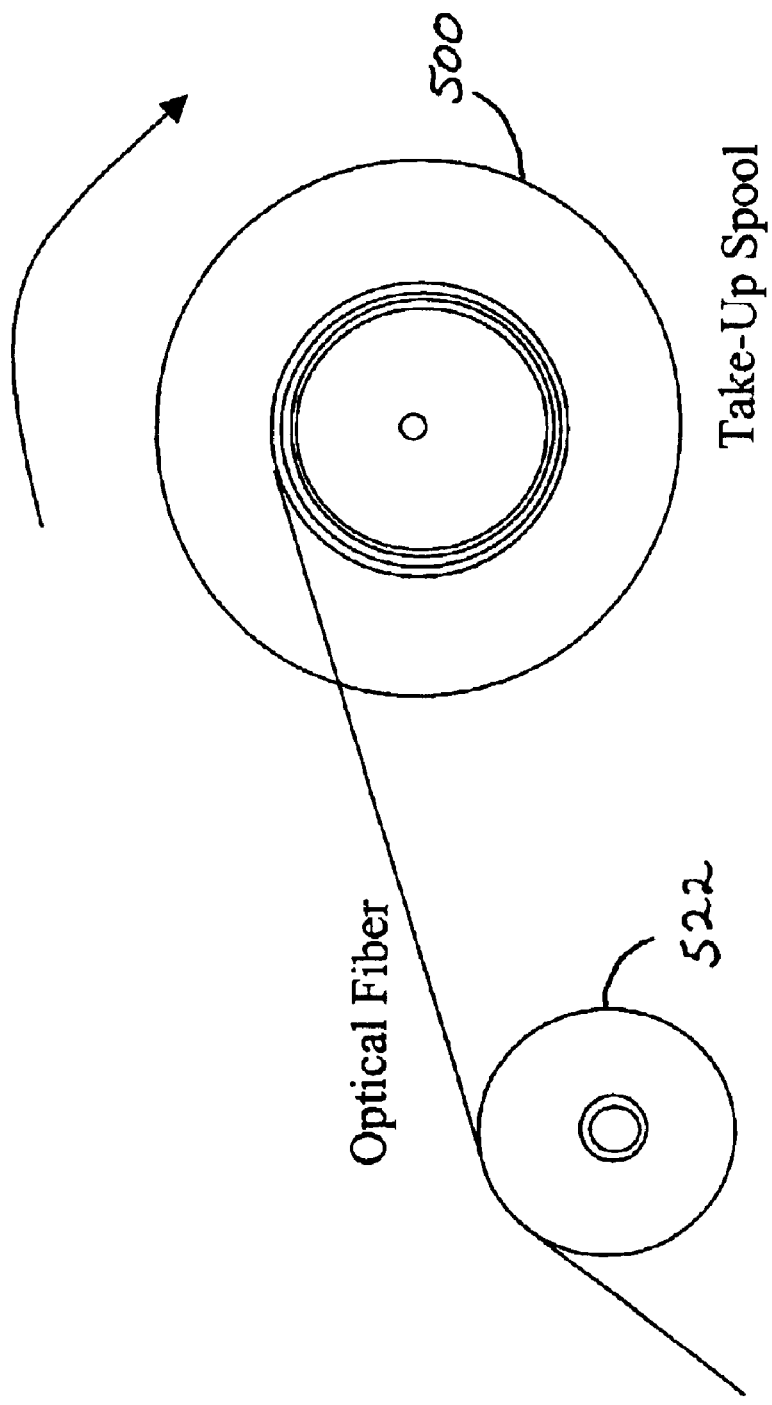
Figure 5C:
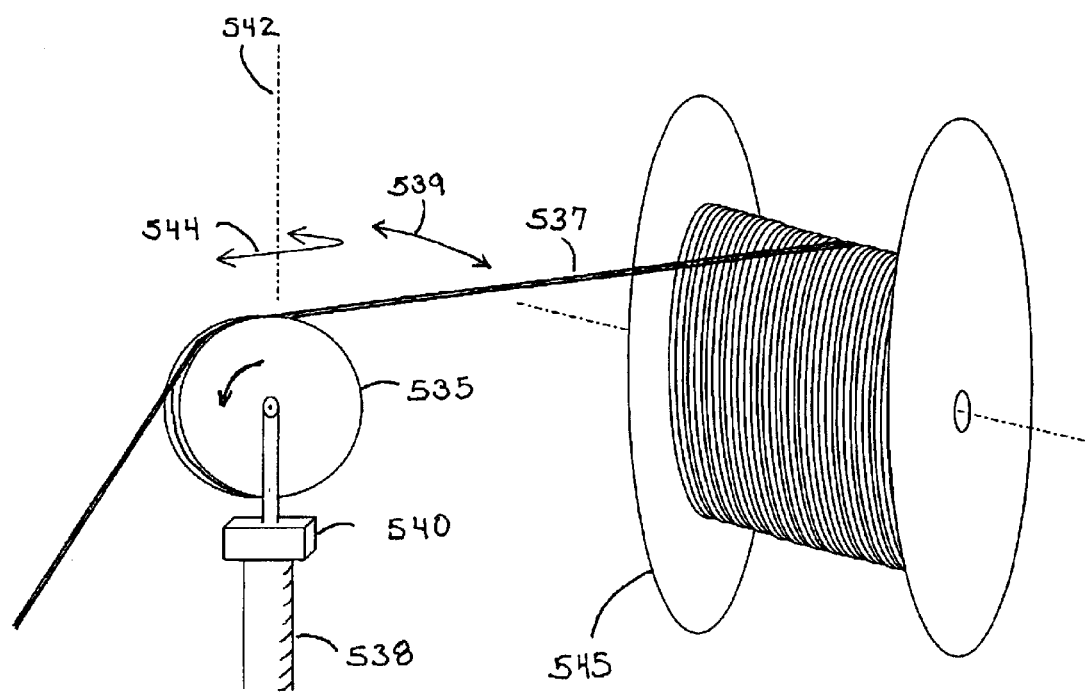

FIGS. 5A–C illustrate variable pitch winding on a take-up spool according to one embodiment of the invention.

Figure 6A:
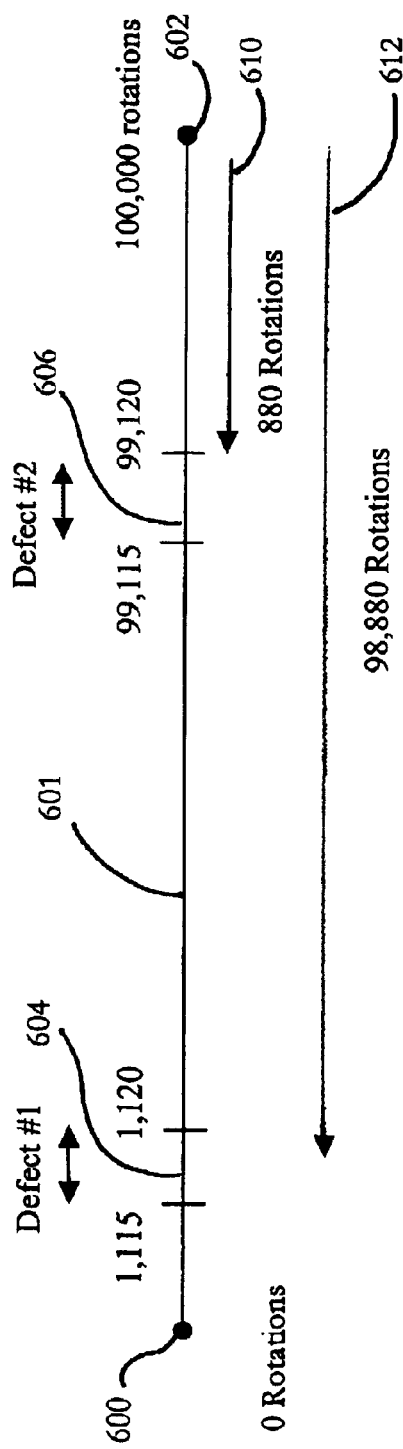
Figure 6B:
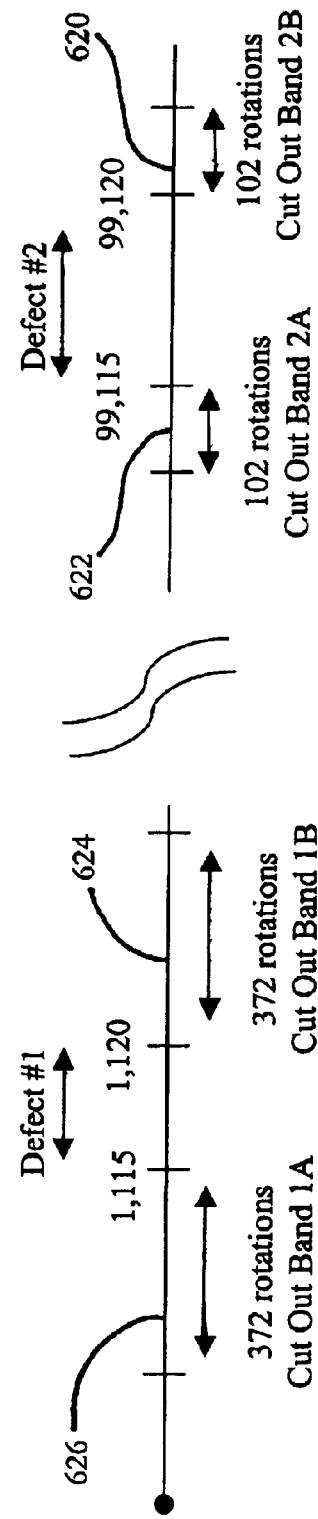

FIGS. 6A and 6B illustrate variable guard bands according to one embodiment of the invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The apparatus and methods of the present invention provide several advantages over conventional systems for locating defects in a previously manufactured and spooled material. Specifically, the apparatus and methods of the present invention use data related to the rotations of the spool on which the material is spooled, as opposed to an odometer through which the material passes to document the location on the spool where defects in the material are present. Using the number of rotations is advantageous as it eliminates issues with fiber slippage and other problems associated with conventional systems that use an odometer for measurement.

It is important to note a major difference between the present invention and conventional systems. Specifically, conventional systems indicate the location on the material where the defect occurs, while the apparatus and methods of the present invention indicate the location on the spool where the defective material is located.

Figure 1:
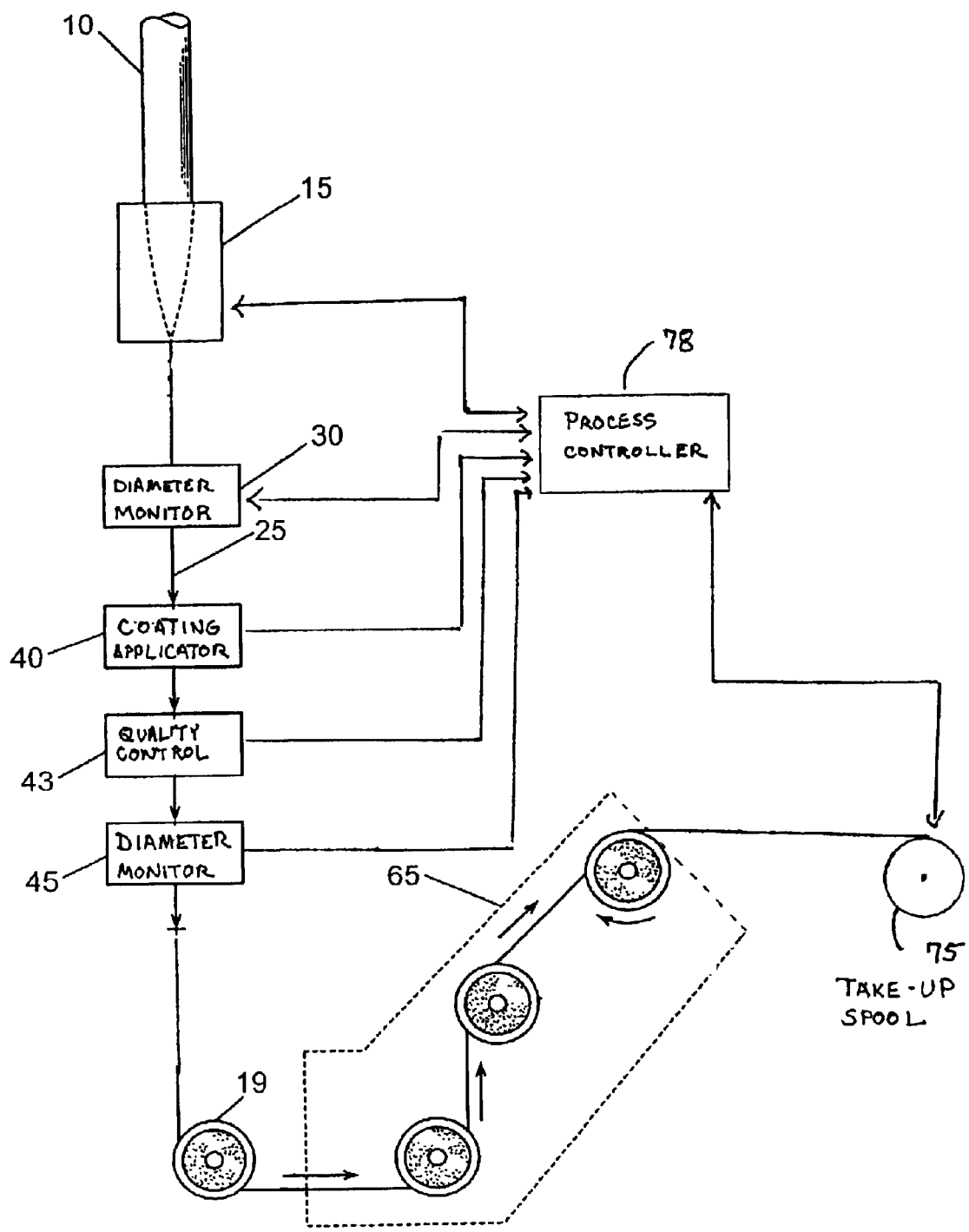
FIG. 1 is an illustration of an apparatus of components involved in manufacturing optical fiber according to one embodiment of the invention.

FIG. 1 illustrates several components used in the manufacturing of optical fiber and illustrates an embodiment according to the principles of the current invention. A solid cylinder of pure glass 10 typically referred to as a perform assembly, is heated using a furnace 15 using conventional means. A portion of the glass becomes molten such that a thin strand of glass that is the optical fiber 25 is drawn from the perform assembly to begin the process. The optical fiber passes through various instruments, such as a diameter monitor 30 that monitors the optical fiber diameter in real-time as it is drawn. The optical fiber passes through a coating applicator 40 and is again monitored for the overall diameter and quality using additional devices 43 and 45. During this time, the fiber has cooled down and encounters a capstan wheel 19 and a series of other take-up wheels 65. The fiber is then rolled onto a take-up spool 75 that accumulates the manufactured fiber.

The take-up spool 75 is driven by a motor providing precise rotational positioning data to the process controller 78. The motor can be, for example, a stepper motor utilizing various positioning sensors that are well known in the art, however, other rotational means using other types of motors could be used. The rotational positioning data is a number representing the number of rotations incurred by the take-up spool since initialization.

The various components of the manufacturing system provide inputs and receive commands from a process controller 78. For illustrating the principles of the present invention, the processor controller 78 receives real time data from the various quality control monitoring devices 30, 40, 43, 45 and take-up spool rotation data from the take-up spool 75. The process controller is also able to write information in real time in a memory location.

The process controller 78 is a computing system programmed to control operation of the optical fiber drawing system. Although not shown, the controller contains many components associated with a computer system, including memory, various types of disk storage for files, monitor, keyboard, et cetera. The process controller 78 is illustrated as receiving the take-up spool rotation data, but the rotation data could be sent to a different system and still embody the principles of the invention. The system could be designed so that the processor controller 78 periodically polls the take-up spool 75 for rotational data, continuously receive the rotational data, or read the rotational data as required.

Importantly, in operation, the process controller, (i.e., computing system) of the present invention receives data from the monitoring devices concerning the quality of the fiber. The process controller further receives information from a counter connected to the take-up spool. When a defect is noted by the monitoring devices, the process controller stores the value from the counter representing the location on the spool where the defect begins. Further, when the monitoring devices detects the end of a defect, the processor controller stores the count value from the counter indicating the location on the spool of the end point of the defect. This is repeated for each defect in the material to thereby map the locations on the spool where defects appear in the fiber.

The process controller 78 maintains information in a file related to the manufacture of the fiber. The file includes a notation of the particular take-up spool being used. The take-up spool is uniquely numbered or otherwise identified with a value that is known by the process controller. A file is created comprising records indicating the spool rotation defect location data. The records identify the location of the defect on the fiber on the take-up spool.

At the beginning of the fiber draw, the take-up spool is initialized so that zero rotations are noted. As fiber is drawn, the take-up spool rotates. The process controller 78 receives the rotational data in real time and simultaneously receives indications of any defects in the optical fiber. Whenever the controller determines a defect, the value of the current rotational data is retained and written to a file along with information indicating the defect. The information may be the type of defect, or a generic indicator that a defect exists. It is necessary to record changes from either state—i.e., acceptable to defective, and defective to acceptable.

Figure 2:
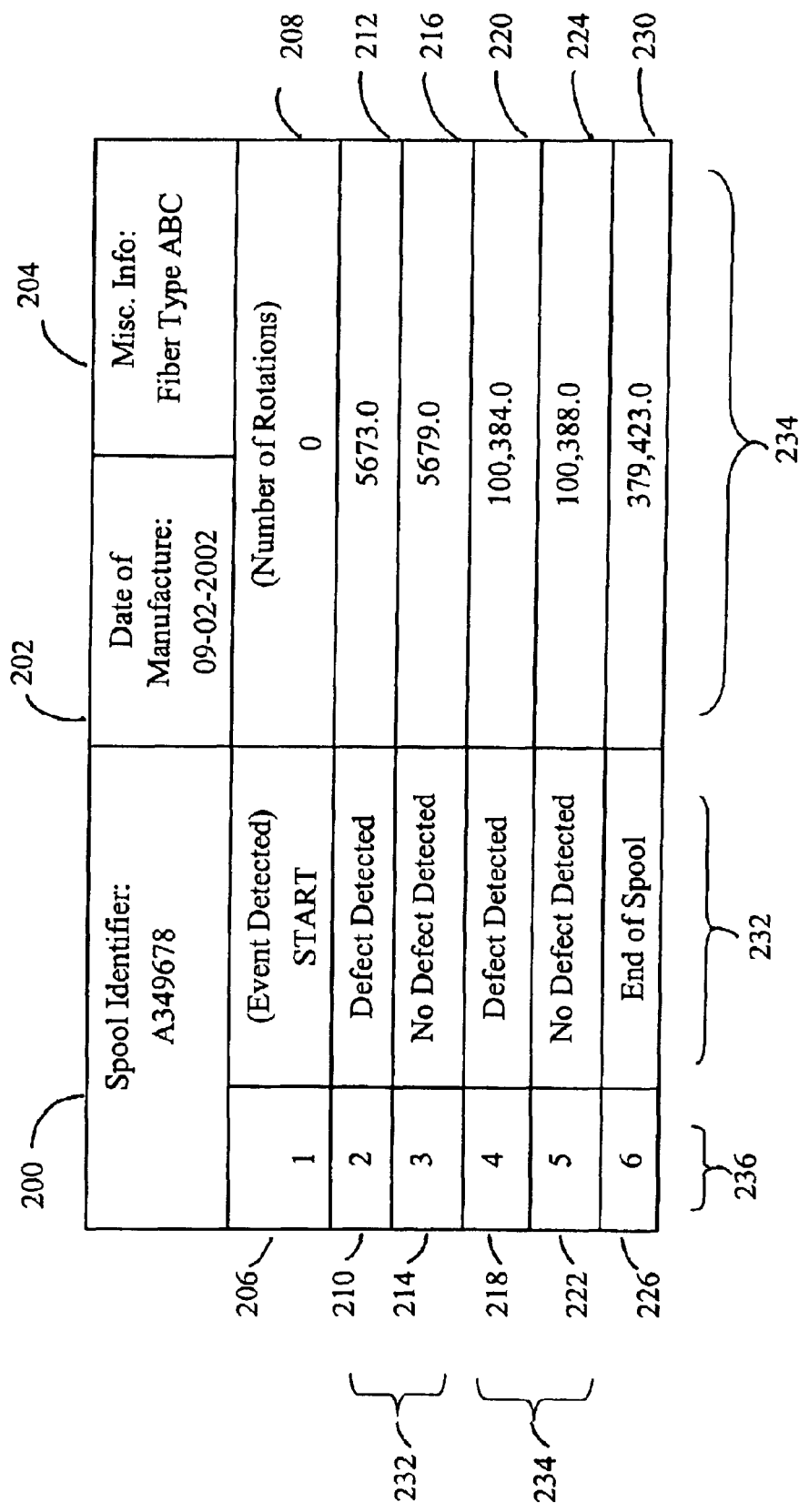
FIG. 2 is an illustration of the format of a file record containing recorded defects present in an optical fiber according to one embodiment of the invention.

FIG. 2 illustrates the Spool Defect Location (SDL) file. The file contains the spool identifier 200 that is required to associate the SDL file with a specific spool. The file format may contain additional fields, such as the date of manufacture 202, the type of fiber manufactured 204, the place of manufacture, etc. Additional information may be recorded, but is not necessary to illustrate the embodiment of the invention. The records of the file preferably include, at a minimum, two fields that comprise the nature of the event 232 and the rotation location 234. Although not necessary, a third column 236 is shown containing the record number and facilitates referencing records.

The first record contains a 'start' 206 indication for the event detected. This is present in every file, even if no defects are located. The corresponding rotation location 208 is zero, indicating the beginning of the spool upon drawing the fiber. In the illustrated file, there are two defects located in the fiber. The first defect 232 comprises records #2 and #3. Record #2 indicates a 'defect detected' 210 at rotation number 5673 and this field 212 indicates the beginning location of the first defect. Record 3 indicates 'end of defect detected' 214 which indicates the end of the defect and which corresponds to a rotation of 5679 216. Thus, the defect was observed for (5679−5673)=6 rotations.

In some circumstances, there may be a number of short defective sections observed and indicated. This illustration of FIG. 2 illustrates a relatively simple case, but which illustrates the principles of the invention. If each transition is recorded in the file, it is possible that additional processing of the file is required to determine the effective 'beginning' and 'end' of the defective section to be removed. For example, if several defects are recorded in the file that are separated by short sections of acceptable fiber, subsequent processing of the file may determine that the relatively short sections of fiber should be considered as defective. Thus, the processing may ascertain the 'beginning' and 'end' of a defective section as encompassing some short acceptable sections of fiber. Alternatively, when the system records the transition from defect to defective free, it may require a minimum time period of detecting acceptable fiber before recording such in the file.

The second defect 234 also comprises two records, with the start of the defect noted 218 at a rotation of 100, 384 220 and the end of the defect occurring 222 at a rotation of 100, 388 224. Finally, each file also contains an 'end of spool' indication 226 indicating the total length of the fiber on the spool 230. It is possible that the only records in a spool defect location file could be the 'start' and 'end of spool' indicators. This would correspond to a defect-free optical fiber. Those skilled in the art will readily obverse that variations in the file format are possible, but which still embody the principles of the invention. For example, various encoding means and indicators could be used. Detecting defective locations on the length of the fiber can be recorded or determined from the file in a variety of ways, and FIG. 2 only illustrates one method of doing so.

Figure 3:
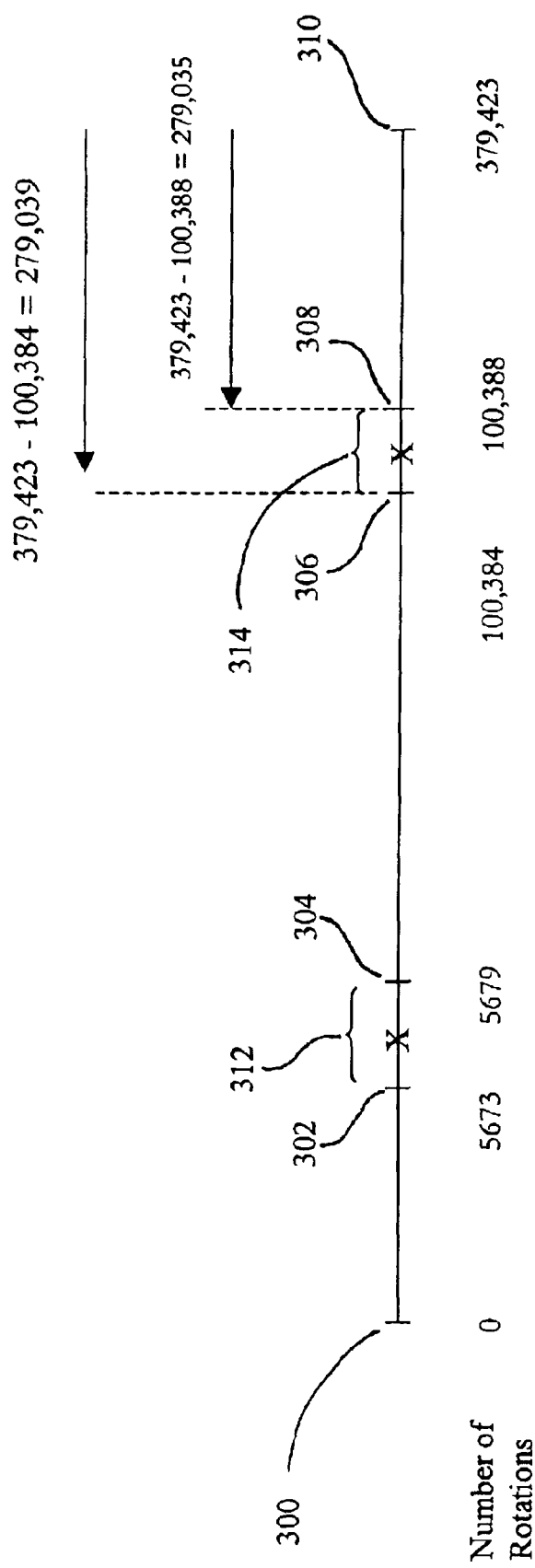
FIG. 3 is an illustration showing the relative locations of defects in an optical fiber corresponding to the file of FIG. 2.

FIG. 3 logically illustrates a length of fiber with the relative positions of the defects of the data associated with FIG. 2 (though not to scale). The fiber begins with a zero number of rotations at a beginning point 300 and ends at 379,423 rotations at the end point 310. It is important to note that the length of fiber corresponding to a single rotation varies along the length of the fiber. The length corresponding to one rotation at the beginning is roughly equal to the circumference of the take-up spool while at the end of the optical fiber, the length of the fiber corresponding to a single rotation is longer. As fiber is wound on a spool, the effective circumference increases. In practice, a variety of factors affect the actual circumference of a given rotation including the number of previous rotations, the thickness of the fiber, the pitch of the winding, the tension used in winding. Importantly, the determination of the defect locations is defined by the present invention is not predicated on a distance calculation of the length of the fiber. Instead, the number of spool rotations is all that is needed to locate the position of detected defects in the fiber on the spool. The fact that the circumference of the fiber winding changes potentially as the rotations increase is not relevant, as the locations of the defect are based on rotations of the spool not the lengths where the defects appear on the fiber. As such, repair of the fiber is not predicated on an odometer with its known potentials for inaccuracy, but are instead predicated on the rotational counts of the take-up spool, thereby eliminating issues related to slippage, different tensions on the fiber, and pitch winding. The use of rotational data provides an indication of where a defect is located on a fiber on a spool, specifically for a particular spool. If the fiber is removed from the spool, i.e., loosely coiled, then the location of the fiber cannot be readily ascertained.

With reference to FIGS. 2 and 3, the first defect 312 is located at a beginning point 302 corresponding to 5673 rotations and ends at an end point 304 of 5679 rotations. Similarly the second defect 314 starts at a point 306 of 100,384 rotations and ends at a point 308 of 100, 388 rotations.

To repair the defects in the fiber following manufacture, the fiber is payed out from the take-up spool, and the defects are removed from the fiber based on their location on the spool; the location of the defects being determined by the stored rotation counts of the take-up spool. As will be appreciated, the rotations were measured from the beginning of the fiber and not the end of the fiber during the spooling process, and as such, the stored spool counts representing the start and stop locations of the defects are measured from the beginning of the fiber and not the end of the fiber. However, as the fiber is unwound in the repair process starting at the end of the fiber, the stored rotations identifying the defects must be recalculated from the end of the fiber as opposed to the start of the fiber. Specifically, once the spool containing the manufactured optical fiber is removed and placed on a rewinder, the end of the optical fiber is payed out from the take-up spool onto a second spool. When the take-up spool is unwound, the second defect is the first defect encountered. Thus, the rotations are computed based on the endpoint of the fiber 304. The second defect 314 will be detected first at a point 308 corresponding to 379, 423–100,388=279, 035 rotations. As mentioned, the defects are indicated based on rotational counts of the spool, as opposed to the length of the fiber. As such, it does not matter that the winding length of fiber varies for each winding on the spool. The locations of the defects are located in reverse order by a simple recalculation of the starting and ending points using the endpoint of the optical fiber. Empirical testing indicates that use of the number of rotations of the spool, as opposed to an odometer for measuring the beginning and end points of a defect is more accurate.

Figure 4:
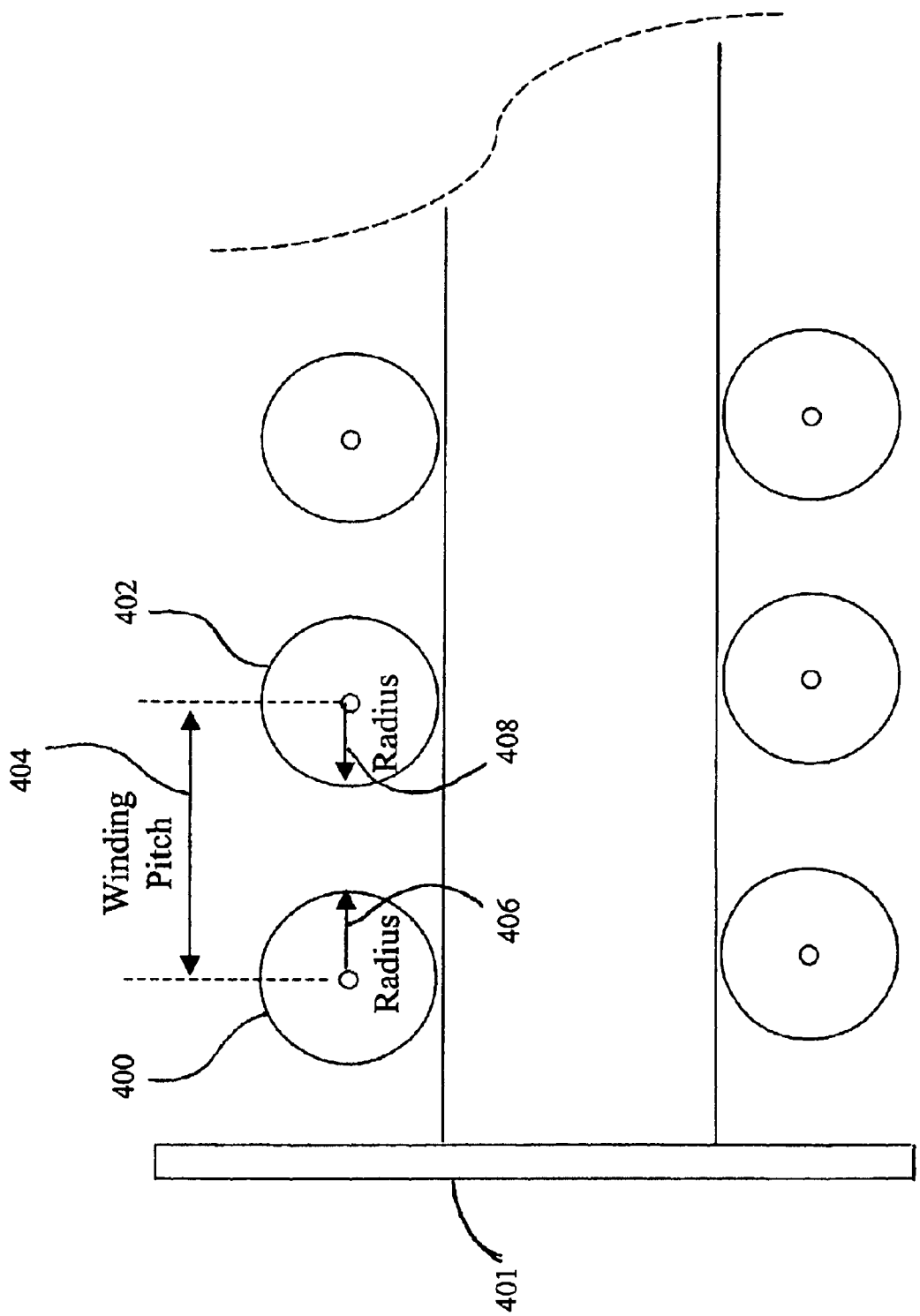
FIG. 4 is an illustration of pitch associated with winding fiber on a spool.

Alternative apparatus and methods are also contemplated for use in correcting defects in a fiber or other spoolable material. These apparatus and methods can be used in place of the apparatus and methods described above, or in conjunction therewith to augment the accuracy of the above-mentioned apparatus and methods. Specifically, the apparatus and methods of the alternative or supplemental embodiment use variable pitch indicators to mark defect locations on a spool. Pitch is a measurement of the 'tightness'with which the fiber is wound on the take-up spool and the changes in pitch can serve as indicators for the start/end of a defective length of fiber. The pitch is defined as the distance between the centers of two adjacent fibers in the same layer. Thus, the minimum pitch is equal to twice the radius of the fiber. As illustrated in FIG. 4, two adjacent fibers 400, 402 in the first layer on a spool 401 are separated by a distance 404 equal to, or greater than the sum of the radii of each fiber 406, 408. The greater the pitch, the greater the separation between the centers of the adjacent fibers.

FIG. 5A illustrates a variable pitch winding according to one embodiment of the invention. A cross section of a take-up spool 500 is illustrated rotating around an axis 502. As the optical fiber is wound on the spool, many layers of fiber are formed thereon. In FIG. 5A, four layers are illustrated with a first layer 504 and successive layers 506, 508, 510 building upon each preceding layer. In the second layer of fibers 506, the pitch is greater due to increased spacing between the adjacent optical fibers.

The pitch of the winding can be determined by a rotating guide wheel 522 on a shaft 524 where the guide wheel 522 moves laterally. A cross sectional view of the take up spool 500 and guide wheel 522 is shown in FIG. 5B. The guide wheel 522 moves laterally simultaneously as the take up spool 500 rotates. The rate of lateral movement determines the pitch of the winding. The slower the lateral movement of the guide wheel relative to the rotation of the spool, the smaller the pitch of the winding. The faster the lateral movement of the guide wheel relative to the rotation of the spool, the greater the pitch of the winding. Those skilled in the art will recognize that alternate arrangements involving other types of guide wheels or other mechanical positioning devices may be used to impart a lateral force on the fiber to affect the pitch of the take-up spool. Alternatively, the distributor (guide wheel) could be kept stationary and the spool moved.

The pitch can be used to indicate defective portions of the optical fiber. In this arrangement, the apparatus and methods of the present invention wind defective portions of the fiber at a different pitch than that of fiber not containing defects. However, depending on the speed at which the take-up spool rotates, the change in pitch may not exactly coincide with the point at which the defect is located. In certain situations, where the take-up spool slowly rotates, the pitch can precisely indicate the location. Typically, in the manufacturing of fiber, the high rotational speeds of the take-up spool result in the change in pitch being registered after some portions of the defect are wound on the spool. In such circumstances, it my be advantageous to incorporate the variable length cut-out band discussed subsequently.

Returning to FIG. 5A, the layers 504, 506, 508, 510 illustrate two different pitches. Specifically, layers 1 504, layer 3 508 and layer 4 510 have a smaller pitch than layer 2 506. Layers 1, 3, and 4 represent acceptable optical fiber, whereas layer 2 represents a defective section of optical fiber.

During manufacturing, the process controller upon detecting a defective section of fiber commands the system to wind the fiber with a different pitch. The process controller does this by affecting the rate of lateral movement of the guide wheel.

FIG. 5A illustrates the principle of using variable pitch to identify defective sections of the optical cable. In the illustrated embodiment, a greater pitch is used to signify a defective length of fiber. However, it is possible that variations could be used in accordance with the principles of the invention; e.g., greater pitch could indicate acceptable fiber and smaller pitch indicating defective fiber. In practice, a spool may have many layers of windings and the change of pitch may occur at any point. The change in pitch is not limited to occurring as illustrated in FIG. 5A, but may occur at any point during the winding process. Thus, a change of pitch may occur in the middle of a layer winding or may involve several layers.

After the take up spool has wound the optical fiber, the spool is removed for postdraw processing to remove the defective sections. Upon rewinding the fiber, an apparatus as in FIG. 5C detects the change in pitch when unwound from the take-up spool. A guide wheel senses the change in pitch as the optical fiber is unwound and this is reported to a controller. The guide wheel assembly in this instance does not impart a lateral force on the fiber as it is being wound as in FIG. 5A, but rather senses a lateral force from the fiber as it is being unwound.

To accomplish this, the guide wheel may freely pivot to thereby sense the lateral rate of movement. Specifically, in FIG. 5C a guide wheel 535 pivots on a shaft 538 to accommodate lateral movement 539 of the optical fiber 537. A sensor 540 observes the relative direction of rotation 544 about a centerline of rotation 542. The rate of change of the pitch based on a known rotational speed of unwinding, the controller can detect a defective section of optical fiber on spool 545.

The above methods of using rotational data and variable pitch enhance the accuracy of locating defective sections in manufactured optical fiber compared to the prior art. The above methods could be used separately or in conjunction with each other to identify defective sections of optical fiber for removal.

Although the above embodiments of the present invention significantly decrease errors, cumulative errors may still affect the accuracy over long or short lengths. To minimize the possibility of allowing defective fiber to remain, the apparatus and methods of the present invention may define cut out bands on either side of the defective section. These define an additional length of fiber adjacent to the defective section that is to be removed. However, defining fixed length cutout bands does not consider the cumulative effect of inaccuracies.

In light of this, the apparatus and methods of the present invention provide improvements in determining the placement of the cutout bands. Specifically, in the present invention, the placement of the cutout bands is based on the location of the defective section relative to the overall fiber length. FIG. 6A illustrates the length of an optical fiber 601 that has a beginning 600 and an endpoint 602, which corresponds to 100,000 rotations on a spool. During manufacturing, two defective sections were detected, defect #1 604 and defect #2 606. This corresponds to rotation measurements of 1,115 and 1,120 for defect #1 and 99,115 and 99,120 for defect #2. After manufacturing, end point 602 is the first end to come off of the spool during rewinding so that defect #2 606 will be the first defect encountered. In a fixed length cut out scheme, the cut out bands adjacent to the defective sections are of fixed length. However, when de-spooling the fiber, defect #2 is encountered in only 880 rotations 610, whereas defect #1 is encountered in 98,880 rotations 612. The cumulative error when de-spooling the fiber to locate defect #2 is relatively minor. However, the cumulative error when de-spooling the fiber to locate defect #1 is much greater, since it involves 98,000 additional rotations. Thus, defect #2 is likely to be located with greater accuracy than defect #1.

To accommodate the difference in cumulative accuracies, a formula is defined for the length of the cutout bands based on the number of rotations when unwinding the fiber. The formula is:

$$\text{Cut Out Margin} = C_1 + (X_1)(R) + C_2(R/R_{tot})$$

where:

$C_1$, is a constant, expressed in rotations;

$X_1$ is a constant;

R is the number of rotations to reach the defect;

$C_2$ is a constant, expressed in rotations;

$R_{tot}$ is the number of rotations of the entire fiber.

The resultant cut out margin is expressed in a number of rotations. For example, if a spool is unwound and the first defect is encountered immediately upon unwinding, the constant $C_1$ could specify a number, (e.g., 10 rotations) which would provide a minimum cut out margin. The value of $X_1$ is another constant based on how many rotations the defect is located from the end. In many instances, this may be zero or a relatively small value, e.g., 0.0001. Thus, for a defect located 10,000 rotations in, this would add an additional rotation. If added to the previous constant of 10, then a cutout margin of 11 would be created. In addition or alternative to a linear based variance of the margin, a margin is defined based on the relative distance of the defect from the beginning of the fiber. In this case $R/R_{tot}$ is a ratio corresponding to where the defect is located relative to the beginning. If the ratio is small, then the defect is located near the beginning of the unwinding process, and the ratio times $C_2$ provides additional variance. Correspondingly, if the $R/R_{tot}$ ratio is near 1, then the defect is located near the end of the fiber when despooling, and the ratio times $C_2$ provides relatively greater size of the cut out band due to potential greater variance in locating the defect. In practice, it may be sufficient to implement the formula using a zero value for $X_1$ or $C_2$ There may also be motivation for creating different values for the constants based on where the cut out band is relative to the defective section. Upon unwinding the spool, a cut out band prior to the defect is defined ('pre-defect') and another cut out band is defined after the defect ('post-defect'). The purpose of having different values would be to create longer post-defect bands. The motivation applies to instances during fiber draw when defects are noted and the fiber breaks. In this case, the process is stopped, the accumulated fiber on the manufacturing floor is removed, the take-up spool is replaced, and the process restarted. In this case, the location of the beginning of the defect may be accurately determined, but there is greater uncertainty associated with the post-defect cut out band.

FIG. 6B illustrates the defects with their respective cut out bands. In this illustration, the 'pre-defect' cut out band is equal to the 'post-defect' cut out band. The bands are defined by the previously identified equation with the following constants:

$$\text{Cut out band} = 100 + 0.0025(R) + 0(R/R_{tot})$$

In this instance, the formula incorporates a constant of 100 rotations plus a variable portion, where the variable portion is a function of the distance of the location of the defect from the end of the fiber (expressed in rotations). The other constant, $C_3$, is zero for illustration purposes. In other illustrations, it may contribute to the variable portion of the equation.

Applying this formula to the defective sections shown in FIG. 6A produces the illustration in FIG. 6B where the cut out band 2B 620 for defect #2=100+0.0025(880), which is 102.2 rotations. Cut out band 2A 622 is 100+0.0025 (885), which is also 102.2 rotations (within rounding). However, the cutout band 1B 624 for defect #1 is 100+0.0025 (98,880), which is 347.2 rotations. The cutout band 1A 626 is approximately the same within rounding (i.e., 100+0.0025 (98,885)). This formula accounts for the additional inaccuracy that can accumulate over greater distances. The formula could be structured alternatively or in addition to use the $(R/R_{tot})$ term.

The formula provided is subject to adjustment, based on a variety of factors, including the type of fiber being manufactured, precision of equipment, length of fiber, and the relative tradeoff desired between minimizing waste and maximizing probability that all defective fiber has been removed. Consequently, no single value of the constants can be expressed as the optimal value for all implementations.

As will be appreciated by those skilled in the art, the invention herein is not limited solely to the manufacture of optical fiber, but applies to the manufacture of other objects as well. For example, the principles of the present invention may apply to other materials with largely a cylindrical cross section such as the wire, cable, rope, string, wire, thread or a combination thereof whether the materials be glass, metal, rubber, synthetic, paper, coated or uncoated, a combination of materials, or otherwise. In addition, many of the principles also apply to flexible materials in the form of essentially endless, flexible flat goods, such as paper, metal, cloth, rubber, plastic, et cetera. As used herein, the term 'material' is used to encompass any of the foregoing examples, whether of largely cylindrical or flat structures, or combinations thereof, and should not be construed to be limited to apply solely to manufacturing glass fiber used for data communications.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for indicating the location of a defect in a material as it is wound on a spool, said method comprising the steps of:
   winding the material on to spool;
   monitoring the material for defects; and
   indicating the location of the material on the spool where at least one defect is present in the material wherein indicating the location of the material on the spool comprises:
   counting each rotation make by the spool during spooling of the material, and
   storing the rotation counts of the spool corresponding to where a defect in the material is located on the spool.

2. A method according to claim 1, wherein when said monitoring step detects a beginning of a defect in the material said storing step stores a first rotational count of the spool, and wherein when said monitoring step detects an end of a defect in the material said storing step stores a second rotational count of the spool to thereby define the location on the spool of a defect in the material.

3. A method according to claim 2, wherein said storing step stores a first and second count representing respectively a beginning and an ending of a defect for each of a plurality of defects in a material.

4. A method according to claim 1 further comprising the step of removing a defect from the material, removing step comprises:
   unwinding the material from the spool;
   counting each rotation made by the spool during the unwinding step; and
   removing portions of the material corresponding to the rotation counts of the spool previously stored in said storing step.

5. A method according to claim 2, wherein said storing step stores an end rotational count of the spool corresponding to an end of the material on the spool, wherein said method further comprises the step of removing a defect from the material, wherein said removing step comprises:
   respectively subtracting the first and second stored rotational counts from the end rotational count to generate first second corrected counts;
   unwinding the material fro the spool;
   counting each rotation made by the spool during the unwinding step; and
   removing portions of the material defined between the first and second corrected counts.

6. A method according to claim 1, wherein said winding step further comprises:
   winding portions of the material free of defects with a first pitch; and
   winding portions of the material having defects with a second pitch that is different from said first pitch.

7. A method according to claim 6 further comprising the step, of removing a defect from the material, wherein said removing step comprises:
   unwinding the material from the spool;
   detecting different pitches with which the material is wound about the spool; and
   removing portions of the material wound about the spool with the second pitch.

8. A method according to claim 6, wherein first and second pitches respectively are associated with first and second indicator, the first indicator indicating a first predetermined length prior to the beginning of a defect in the material on the spool and the second indicator indicating a second predetermined length after the ending of the defect in the material on the spool, wherein said method further comprises the step of removing a portion of the material defined by the first and second indicators.

9. A method for indicating the location of a defect in a material as it is wound on a spool, said method comprising the steps of:
   winding the material on to spool;
   monitoring the material for defects;
   counting each rotation made by the spool during spooling of the material; and
   storing the rotation counts of the spool corresponding to where a defect in the material is located on the spool.

10. A method according to claim 9, wherein when said monitoring step detects a beginning of a defect in the material said storing step stores a first rotational count of the spool, and wherein when said monitoring step detects an end of a defect in the material said storing step stores a second rotational count of the spool to thereby define the location on the spool of a defect in the material.

11. A method according to claim 9 further comprising the step of removing a defect from the material, wherein said removing step comprises:
   unwinding the material from the spool;
   counting each rotation made by the spool during the unwinding step; and
   removing portions of the material corresponding to the rotation counts of the spool previously stored in said storing step.

12. A method for removing a defect in a material on a spool, said method comprising the steps of:
   winding the material on to spool;
   monitoring the material for defects;
   indicating the location on the spool where at least one defect is present in the material, wherein said indicating the location on the spool comprises
      winding portions of the material free of defects with a first pitch width, and
      winding portions of the material having defects with a second pitch width that is different from said first pitch width;
   unwinding the material from the spool;
   detecting different pitches with which the material is wound about the spool; and
   removing portions of the material wound about the spool with the second pitch width wherein removing portions of the material wound about the spool with a second pitch width comprises removing portions of the material wound about the spool with a second pitch and adjacent cutout bands.

13. An apparatus for indicating the location of defects in a material as it is wound on a spool comprising:
   a winding device for winding the material onto a spool;
   a monitoring device in communication with the material for monitoring defects in the material as it is wound onto the spool; and an indicator in communication with said monitoring device, wherein said indicator indicates the location on the spool where a defect is present in the material, the indicator further comprising a counter in communication with the spool, wherein said counter counts each rotation of the spool during spooling of the materials, a computing system in communication with said counter, and a storage device in communication with said processor, wherein said computing system stores in said storage device the rotation counts of the spool corresponding to a location on the spool where a defect occurs in the material.

14. An apparatus according to claim 13, wherein when said monitoring device detects a beginning of a defect in the material said computing system stores in said storage device a first rotational count of the spool, and wherein when said monitoring device detects an end of a defect in the material said computing system stores in said storage device a second rotational count of the spool.

15. An apparatus according to claim 14, wherein said computing system stores in said storage device a first and second count representing respectively a beginning and an ending of a defect for each of a plurality of defects in the material.

16. An apparatus according to claim 13 further comprising a removal device for removing a defect from the material, wherein said removal device comprises:

an unwinding device for winding the material from the spool;

a counter in communication with the spool, wherein said counter counts each rotation made by the spool during the unwinding; and an indicator in communication with said counter for indicating the sections of the material corresponding to the rotation counts of the spool previously stored in said storage device representing the location on the stool where a defect is present in the material.

17. An apparatus according to claim 14, wherein said computing system respectively subtracts the first and second stored rotational counts from an end rotational count of the spool corresponding to an end of the material on the spool to thereby generate first and second corrected counts, wherein said apparatus further comprises a removal device comprising:

an unwinding device for unwinding the material from the spool;

a counter in communication with the spool, wherein said counter counts each rotation made by the spool during the unwinding; and an indicator in communication with said counter for indicating a section of the material defined between the first and second corrected counts.

18. An apparatus for indicating the location of defects in a material as it is wound on a spool comprising:

a winding device for winding the material onto a spool;

a monitoring device in communication with the material for monitoring defects in the material as it is wound onto the spool;

an indicator in communication with said monitoring device, wherein said indicator indicates the location on the spool where a defect is present in the material, wherein said indicator further comprises a guide device for guiding the material as it is wound on the spool by said winding device, wherein said guide device winds sections of the material free of defects with a first pitch and sections of the material containing defects with a second pitch that is different from the first pitch;

an unwinding device for unwinding the material from the spool;

a detecting device in communication with the material for detecting different pitch with which the material is wound about the spool wherein said detecting device comprises a shaft and a guide wheel in pivot communication with said shaft and in communication with the material, wherein as the material is unwound from the spool, said guide wheel pivots as the pitch width with which the material is spooled on the spool changes, thereby sensing the pitch width of the material; and a computing system in communication with said indicator and said measurement device, wherein said computing system subtracts the first and second indicators respectively from an end indicator representing the end of the material to generate first and second corrected indicators, determines first and second cut out margins based on the length of the material at the first and second corrected indicators of the material using the formula comprising a fixed part and a variable part wherein the variable part is proportional to the location of the defect relative to the end of the material, and subtracts the first and second cut out margins respectively from the first and second corrected indicators to define first and second cut out end points representing the section of the material to be removed.

19. A method for removing a defect in a material wound on a spool, said method comprising the steps of:

winding the material on to the spool;

monitoring the material for defects;

recording a first rotational count where a beginning of a defective section of the material is detected;

recording a second rotational count where the end of the defective section of the material is detected;

unwinding the material from the spool until a first point corresponding to the second rotational count less a first predetermined count is reached;

cutting the material;

unwinding the material from the spool until a second point corresponding to the first rotational count plus a second predetermined count is reached; and removing the material between the first point and second point.

20. The method of claim 19 wherein the length of material between the first rotational count and the first predetermined count comprises a first cutout band.

21. The method of claim 20 where the length of material between the second rotational count and the second predetermined count comprises a second cutout band.

22. The method of claim 21 where a computed length of the first cutout band is the same as a computer length of the second cutout band.

23. The method of claim 19 where the first cutout band corresponds to a whole number of rotational counts.

* * * * *